United States Patent
Faulbecker et al.

(10) Patent No.: US 6,183,369 B1
(45) Date of Patent: *Feb. 6, 2001

(54) SEALING ASSEMBLY FOR A CROSS MEMBER UNIT FOR UNIVERSAL JOINTS

(75) Inventors: Gerd Faulbecker, Hattingen; Manfred Meineke, Witten; Rolf Sedlmeier, Kamp-Lintfort, all of (DE)

(73) Assignee: GKN Automotive AG, Lohmar (DE)

( * ) Notice: Under 35 U.S.C. 154(b), the term of this patent shall be extended for 0 days.

This patent is subject to a terminal disclaimer.

(21) Appl. No.: 08/739,227

(22) Filed: Oct. 28, 1996

(30) Foreign Application Priority Data

Jun. 5, 1996 (DE) .............................. 196 22 444

(51) Int. Cl.$^7$ ........................................ F16D 3/16
(52) U.S. Cl. ................. 464/131; 464/11; 464/136; 277/152
(58) Field of Search .................. 464/131, 11, 128, 464/136; 277/152, 208

(56) References Cited

U.S. PATENT DOCUMENTS

| | | | |
|---|---|---|---|
| 2,996,901 | * 8/1961 | Kleinschmidt | 464/131 |
| 3,200,615 | 8/1965 | Stokely . | |
| 3,906,746 | * 9/1975 | Haines | 464/131 |
| 4,576,382 | * 3/1986 | Scharting et al. | 277/152 X |
| 4,645,474 | * 2/1987 | Olschewski | 464/131 |
| 4,834,691 | * 5/1989 | Schultze et al. | 277/152 X |
| 4,861,315 | 8/1989 | Mazziotti . | |
| 4,874,349 | * 10/1989 | Gall | 464/131 X |
| 5,026,324 | * 6/1991 | Schurger et al. | 464/131 |
| 5,407,387 | * 4/1995 | Mazziotti et al. | 464/131 |
| 5,588,915 | * 12/1996 | Smith | 464/131 X |
| 5,613,691 | * 3/1997 | Komai et al. | 277/152 |

FOREIGN PATENT DOCUMENTS

| | | |
|---|---|---|
| 34 28 389 A1 | 2/1986 | (DE) . |
| 87 05 291 | 7/1987 | (DE) . |
| 86 12 910 | 8/1987 | (DE) . |
| 87 14 948 | 2/1988 | (DE) . |
| 88 16 432 U | 9/1989 | (DE) . |
| 38 06 397 C2 | 12/1989 | (DE) . |
| 90 14 393 U | 2/1991 | (DE) . |
| 41 09 133 A1 | 10/1991 | (DE) . |
| 41 28 179 A1 | 2/1993 | (DE) . |
| 44 08 831 A1 | 9/1995 | (DE) . |
| 0 083 161 A1 | 7/1983 | (EP) . |
| 2450976 | 10/1980 | (FR) . |
| 2526509 | 11/1983 | (FR) . |
| 2680556 | 2/1993 | (FR) . |
| 2 072 764 | 10/1981 | (GB) . |
| 54-125949 | 9/1979 | (JP) . |
| 62-82427 | 5/1987 | (JP) . |
| 64-26028 | 1/1989 | (JP) . |
| 3-20612 | 3/1991 | (JP) . |

* cited by examiner

Primary Examiner—Donald P. Walsh
Assistant Examiner—Emmanuel M. Marcelo
(74) Attorney, Agent, or Firm—Harness, Dickey & Pierce, P.L.C.

(57) ABSTRACT

A cross member unit for universal joints has a cross member (6) with four arms (17). Each opposing two arms (17) define a common longitudinal axis 7. A bearing bush (9) is provided per arm (17) which covers the arm (17). Rolling contact members (29), in the form of a ring, are arranged in the intermediate space between the casing (23) of the bearing bush (9) and the cylindrical running face (19) of the arm (17). A preseal (38) is arranged towards the open end (27) of the bearing bush (9) between the arms (17) and the casing (23). To achieve a high running performance and a static sealing effect, the preseal (38), in its bore (40), is provided with beads (41, 42) which are firmly positioned on the seat portion (22) of the arm (17).

6 Claims, 2 Drawing Sheets

SEALING ASSEMBLY FOR A CROSS MEMBER UNIT FOR UNIVERSAL JOINTS

BACKGROUND OF THE INVENTION

The invention relates to a cross member unit for universal joints. The cross member unit has a cross member with four arms. Each two arms define a common longitudinal axis and each arm has an end face. A cylindrical bearing face adjoins the end face which, in turn, is followed by a sealing face and furthermore a seat portion. A bearing bush is provided per arm. The bearing bush includes a tubular, cylindrical casing whose inner face is designed as a running face. The bearing bush is arranged coaxially around the arm with an annular gap. The bearing bush has a base which covers the arm end face and the bearing bush open end includes a running face. Rolling contact members, in the form of rollers or needles, are rollingly arranged in the annular gap. The rollers or needles form a ring around the arm on the running face of the arm and on the inner face of the casing. An annular main seal is firmly inserted into the bearing bush from the open end. The seal includes at least one sealing lip to seal the sealing face of the arm. An annular preseal is arranged on the seat portion of the arm. The preseal includes a sealing lip to sealingly rest against the running face provided at the open end of the bearing bush.

A cross member unit is described in EP 03 21 076. Here, the main seal is fixed to the inner face of the bearing bush by means of a metallic carrier. The seal has two sealing lips. One lip sealingly rests against a cylindrical sealing face of the cross member arm. The other lip rests against a conically extending sealing face of the cross member arm. Furthermore, a preseal is provided in the form of an angle ring arranged on a cylindrical face of the arm. The cylindrical face adjoins the sealing face for the sealing lips of the main seal. The preseal extends over the outer face of the bearing bush by means of a leg which extends parallel to the inner face of the bearing bush. Together with an inwardly directed bead engaging a groove in the outer face of the bearing bush, the preseal forms a labyrinth seal. Friction contact does not exist between the bearing bush and the preseal. However, the preseal itself is positioned, through friction contact, on the associated seat portion of the arm of the cross member.

An improved embodiment of such sealing assemblies with a main seal and preseal for relubricatable cross member units is described in DE 88 05 833 U1. Here, the main seal is firmly inserted into the bearing bush and is provided with two sealing lips. The lips seal a cylindrical sealing face of the cross member. The preseal is arranged, via an annular portion, on a cylindrical portion of the cross member. The cylindrical portion constitutes an extension of the sealing face for the sealing lips of the main seal. The preseal is supported on a curved face, if viewed in the axial direction of the arm. Furthermore, starting from said first leg used for fixing the preseal on the arm, the preseal includes a second leg which is arranged at a radial distance, with reference to the longitudinal axis, and is connected to the first leg by a web. Also, the second leg externally extends over the bearing bush.

All the above embodiments are disadvantageous in that there is no defined seat for the preseal on the cross member arm. Thus, there may be an increase in wear and leakages may also occur. The preseal is able to rotate on the arm, which means that the preseal fit progressively loosens. It is possible for lubricant to leak out and if the seal moves on the seat face, it may be destroyed.

In the case of commercial vehicles, especially high performance vehicles, the objective is to reduce maintenance periods to a minimum. If possible, it is desirable to guarantee a predetermined maintenance-free service life. The service life, in the case of commercial vehicles, is approximately 1 million kilometers. In particular, this applies to vehicles with a permitted gross vehicle weight of more than fifteen (15) tons.

SUMMARY OF THE INVENTION

It is an object of the invention to propose a cross member unit for universal joints with improved service life. Thus, it is desirable to guarantee a high running performance for vehicles with driveshafts including universal joints with such cross member units.

In accordance with the invention, a seat portion of the arm includes a cylindrical seat portion. Starting from the seat portion, viewed in a section containing the longitudinal axis, a curved seat portion extends curve-like away from the longitudinal axis. The preseal has a bore which includes a first bore portion with at least one continuous bead which projects radially inwardly towards the longitudinal axis. The first portion positions the preseal on the seat portion in a pretensioned way. The first bore portion, in the unfitted or untensioned condition, leaves an open aperture which is smaller than the diameter of the cylindrical seat portion of the arm. Furthermore, the bore of the preseal includes a second bore portion adapted to the way in which the curved seat portion of the arm extends.

A firm fit is achieved by providing at least one bead arranged on the cylindrical seat portion. The pretension which holds the preseal on the cross member arm may be determined by the dimensions of the first bead. If one bead is not sufficient, it is possible to provide a plurality of beads arranged parallel relative to one another. In this way, static sealing is ensured between the preseal and the arm. Accordingly, the conditions of movement are clearly defined. The unit, which includes a cross member arm and preseal, moves relative to the bearing bush fixed in the yoke bore of the yoke arm in the region provided for a contact seal and in the region of the sealing lip which is in contact with a corresponding stop face at the open end of the bearing bush. It is thus possible to achieve clearly defined sealing conditions. Further, the preseal remains in its position even if axial forces occur, no positional changes occur in the axial direction which would have negative effects on the service life of the sealing lip, which has a sealing function relative to the bearing bush. In consequence, the pretensioning conditions remain constant at the sealing lip sealing the running face at the open end of the bearing bush. Furthermore, the shape of the seat portion ensures that the pretension cannot result in axial forces which may displace the preseal.

In addition, the preseal is slid into its end position on the seat portion. The end position is necessary to enable the sealing lip to assume its predetermined position relative to the running face at the bearing bush.

In a further embodiment of the invention, the second bore portion is arranged in a pretensioned way on the curved seat portion. However, because of the high pretension achieved by the beads, it is unable to displace the preseal. In a preferred embodiment, the first bore portion of the preseal is associated with two beads. To maintain the high pretension over a long period, it is also proposed that the preseal include an elastomer material and a metal reinforcement insert.

According to a further embodiment, the preseal is U-shaped in a sectional plane containing the longitudinal axis to ensure that the required pretensioning conditions of the preseal relative to the arm, on the one hand, and the required pretension of the sealing lip relative to the running face of the bearing bush, on the other hand, are independent of one another. The first leg closest to the longitudinal axis includes the bore. The bore positions the preseal on the seat portion of the arm. The outer second leg, connected to the first leg by a web, includes the sealing lip which is intended to rest against the stop face of the bearing bush.

To ensure that the preseal together with the bearing bush and the main seal can be fitted in one operation, in a further embodiment of the invention, the main seal includes an annular metallic carrier or a reinforcing insert which projects from an open end of the bearing bush in the direction of the preseal. The carrier or insert extends into the annular intermediate space between the two legs of the preseal. To ensure that the forces applied by the carrier to the preseal are introduced advantageously, the carrier, at its end extending into the region between the legs of the preseal, includes a collar. The collar, with reference to the longitudinal axis, is directed outwardly. The collar stops against cams which, opposite the collar, are formed onto the web of the preseal in the annular intermediate space.

The sealing effect of the preseal can be further improved by the outer or second leg of the preseal including a second continuous sealing lip. The second sealing lip sealingly rests against an outer face of the carrier. The second sealing lip can simultaneously be used to hold the preseal in a prefitted condition relative to the unfitted bearing bush. The preseal is loosely attached, so to speak, to the carrier of the main seal which is firmly inserted into the bearing bush.

From the following detailed description, taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE DRAWINGS

Figure 1:
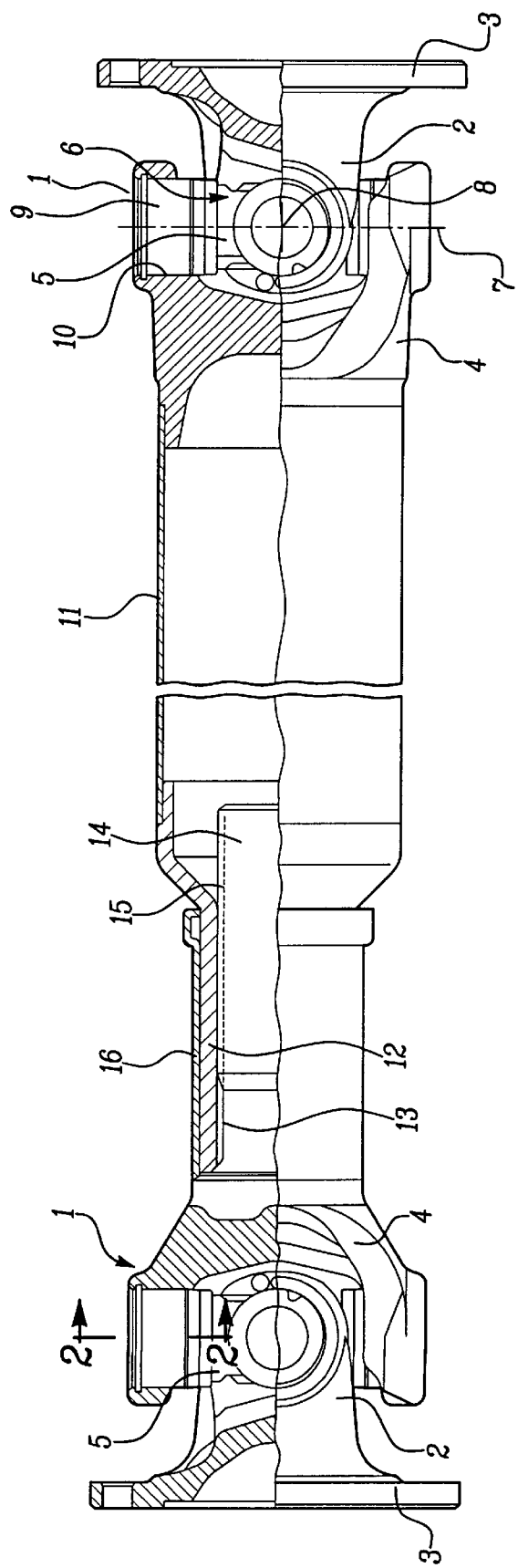
FIG. 1 is a half section of a side elevation view of a driveshaft provided with universal joints.

FIG. 1 shows a driveshaft with two universal joints 1, 1'. Each of the two universal joints 1, 1' include a first joint yoke 2 provided with a flange 3. A second joint yoke 4 is provided per universal joint 1, 1'. Both joint yokes 2, 4 are connected to one another by a cross member unit such that the first joint yoke 2 is able to carry out pivot movements around the longitudinal axis 8. The assembly, which includes the first joint yoke 2 and the cross member unit 5, is able to carry out a pivot movement around the second longitudinal axis 7 relative to the second joint yoke 4. The cross member unit 5 includes a cross member 6 with four arms 17. Each arm includes a bearing assembly which includes a bearing bush 9 received in a yoke bore 10 of the respective joint yokes 2, 4.

A tube 11 is firmly connected to the second joint yoke 4 associated with the joint 1. The tube 11 carries the plunging sleeve 12. The plunging sleeve 12 has a central bore with splines 13. The splines' teeth extend parallel to the longitudinal axis and are worked into the wall of the central bore. A plunging journal 14, with outside splines 15, is longitudinally adjustably received in the sleeve central bore. The plunging journal 14 is firmly connected to the second joint yoke 4 of the universal joint 1'. The longitudinal plunging assembly, which includes the plunging journal 14 and the plunging sleeve 12, is able to accommodate changes in length which result from the change in the position of the universal-jointed shaft and from the articulation of the two universal joints 1, 1' relative to one another. The longitudinal plunging assembly is sealed by a protective tube 16. One end of the tube is secured to the second joint yoke 4 of the universal joint 1' and covers the outer face of the plunging sleeve 12. The other end of the protective tube 16 includes a seal which has a sealing function relative to the outer face. The two flanges 3 serve to be connected to a driving and driven part of the driveline into which the universal-jointed shaft is inserted.

Figures 2, 3:
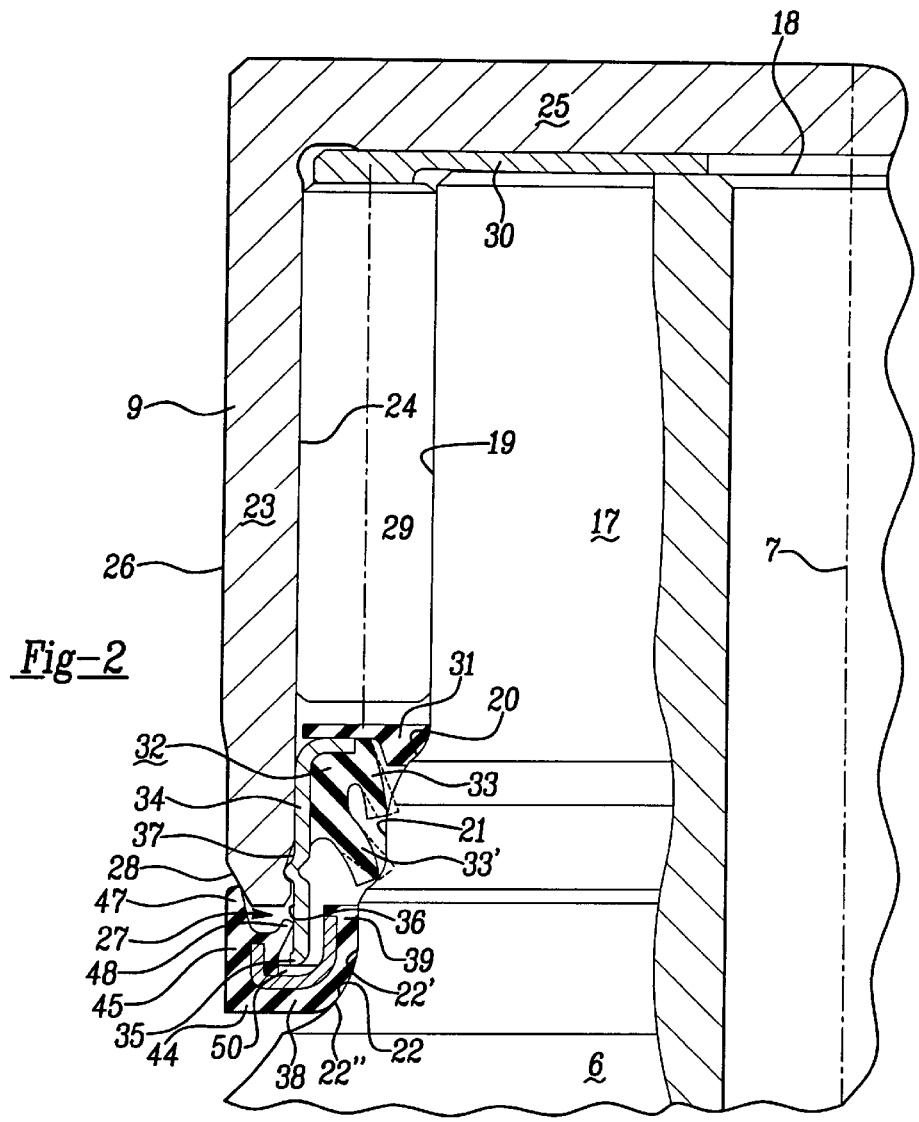
FIG. 2 is an enlarged cross-section view of a detail of the cross member unit, especially with reference to the design and arrangement of the preseal.
FIG. 3 is an enlarged cross-section view of a detail through a preseal.

FIG. 2 shows a detail of the cross member unit 5 in half section with the sectional plane including the longitudinal axis 7. Part of the cross member 6 with the arm 17 is visible. The arm 17 includes an end face 18 and, starting from the latter, a cylindrical running face 19.

The cylindrical running face 19, away from the end face 18, is followed by a shoulder 20. The shoulder cross-section increases starting from the cylindrical running face 19. The shoulder 20 has the shape of a curve. The shoulder 20 is followed by a sealing face 21. The sealing face 21 includes a conical face and a cylindrical face with radius transitions. The sealing face 21, via a conical transition, is followed by a seat portion 22 and, towards the conical transition face, it includes a cylindrical seat portion 22' and, starting from the latter, a curve-shaped seat portion 22".

A bearing bush 9 with casing 23 includes a cylindrical inner face 24 and a cylindrical outer face 26 arranged on the arm 17. The cylindrical outer face 26 serves to accommodate the bearing bush 9 in the yoke bore 10 of a joint yoke. Furthermore, the bearing bush 9 includes a base 25 whose inner base face covers the end face 18 of the arm 17. The other end of the bearing bush 9 constitutes the open end 27. In the region of the open end 27, the end face of the bearing bush is provided with a conically extending running face 28.

A ring of rolling contact members 29, in the form of needles or rollers, is arranged in the annular gap between the inner face 24 of the casing 23 of the bearing bush 9 and the cylindrical running face 19 of the arm 17. Towards the base 25 of the bearing bush 9, the rolling contact members 29 are supported on a sliding disc 30. The sliding disc 30 is arranged between the inner base face and the end face 28. The sliding disc 30, with reference to the longitudinal axis 7, extends into the annular gap containing the rolling contact members 29. The movement of the rolling contact members 29 parallel to the longitudinal axis 7 and away from the end face 18 is limited by the stop face 31.

The stop face 31 includes a supporting bore by means of which it rests against the shoulder 20 of the arm 17. The supporting bore is provided with circumferentially distributed grooves one of which is shown in FIG. 2. The grooves enable passage of lubricant from the region of the annular gap, which contain the rolling members 29, in the direction of the main seal 32.

Along the longitudinal axis 7, the main seal 32 includes two sealing lips 33, 33' arranged one behind the other. Furthermore, it can be seen that the sealing lips 33, 33' starting from the carrier 34, extend away from the end face 18 towards the sealing face 21. The main seal 32 includes a carrier 34 which is provided in the form of a metallic sleeve. The sleeve, towards the stop face 31, includes a first collar which extends inwardly in the direction of the longitudinal axis 7. The main seal 32, via the outer face 36 of the carrier 34, is firmly received in the bore of the bearing bush 9. The bore includes the inner face 24.

The part of the main seal 32 which has a sealing function and includes the sealing lips 33, 33' is made of an elastomer material. The elastomeric material is firmly, non-removably connected to the carrier 34. Furthermore, the carrier 34 includes a portion which projects beyond the open end 27 of the bearing bush 9. The end of the carrier 34 projecting from the bearing bush 9 is provided with a second collar 35 which extends outwardly away from the longitudinal axis 7. The main seal 32 may additionally be secured relative to the bearing bush 9 by formations arranged in a circumferentially distributed way at the carrier 34. By way of partial deformation, portions of the carrier 34 are deformed into a circumferentially extending groove 37 in the inner face 24 of the bearing bush 9.

The preseal 38 is positioned in front of the open end 27 of the bearing bush 9. In connection with the description of the preseal 38, reference is also made to FIG. 3. The preseal includes a first leg 39 with a bore 40. The bore 40 defines a first bore portion with a first continuous bead 41. In the assembled condition as shown in FIG. 2, by pressing the preseal 38 onto the arm 17 and its cylindrical seat portion 22', the bead is deformed in such a way that it is adapted to the cylindrical contour of the cylindrical seat portion 22'. The first bead 41 is shown in dashed lines in FIG. 2 in its untensioned condition. The same applies to the second bead 42 which is positioned approximately in the region of transition between the cylindrical seat portion 22' and the curved seat portion 22'.

The second bead 42 is followed by the curved bore portion 43. The first leg 39 of the preseal 39 is arranged on the respective curved seat portion 22" of the arm 17. The first leg 39 changes into the web 44 which, substantially, extends radially away from the longitudinal axis 7. At a radial distance from the first leg 39, the web 44 is followed by the outer second leg 45 which, at its end projecting towards the open end 27 of the bearing bush 9, is provided with a first sealing lip 47. The first sealing lip 47 is intended to rest against the conical running face 28 of the bearing bush 9. It can also be seen that the first sealing lip 47 rests against the running face 28 in a pretensioned condition. The untensioned condition is illustrated by dashed lines.

The carrier 34 of the main seal 32 projects into the annular intermediate space 46 between the two legs 39, 45 of the preseal 38. The second leg 45 of the preseal 38 is associated with a second sealing lip 48. The second sealing lip 48, for sealing purposes, rests against the outer face 36 of the carrier 34 in a pretensioned condition. Again, the untensioned condition of the sealing lip 48 is shown in dashed lines.

Furthermore, in the annular intermediate space 46, between the two legs 39, 45, towards the web 44, the preseal 38 is provided with circumferentially distributed cams 50 which are positioned opposite the second collar 35 of the carrier 34 of the main seal 32. The carrier 34, by means of its collar 35, serves to slide the assembled unit of the bearing bush 9, the sliding disc 30, the rolling contact members 29, the stop disc 31, the main seal 32 and the preseal 38 attached to the carrier 34 onto the arm 17. The preseal 38 is pressed onto the seat portion 22 in its correct position and the two sealing lips 47 and 48 are not overloaded. The second sealing lip 48 at the same time serves to hold the preseal 38 in a pre-fitted condition relative to the bearing bush 9. This is due to the fact that the free opening cross-section of the sealing lip 48 is smaller than the outer diameter of the collar 35 in the fitted condition, when resting against the outer face 36. The two sealing lips 47, 48 of the preseal 38 are oriented towards the open end 27 and the base 25 of the bearing bush 9. Furthermore, the preseal 38 is provided with reinforcing insert 49 made of metal. Passages are provided to enable the emergence of the lubricant in the region of the second collar 35. Thus, circumferential spaces are provided between the cams 50.

When fitting the bearing bush 9 in the above-described unit, the rolling contact members 29 are inserted with a lubricant. Thus, the rolling contact members stick, so to speak, to the inner face 24 of the bearing bush 9. When sliding the bearing bush 9 in the preassembled condition onto the arm 17, the carrier 34, via its collar 35, is supported against the cam 50 of the preseal 38 and presses the preseal onto the seat portion 22 until the predetermined design position has been reached.

While the above detailed description describes the preferred embodiment of the present invention, the invention is susceptible to modification, variation and alteration without deviating from the scope and fair meaning of the subjoined claims.

We claim:

1. A cross member unit for universal joints, comprising:

a cross member with four arms, each opposing two arms defining a common longitudinal axis, each arm including an end face, a cylindrical bearing face adjoining the end face, a sealing face adjacent said bearing face, and a seat portion adjacent said sealing face;

a bearing bush provided per arm, each bearing bush including a tubular, cylindrical casing whose inner face is designed as a running face and which is arranged coaxially around the arm defining an annular gap between the cylindrical casing and arm, a base covering the end face of the arm and an open end with a running face;

rolling contact members in the form of rollers or needles are rollingly arranged in the annular gap in the form of a ring around the arm on the running face of the arm and on the inner face of the casing;

an annular main seal firmly inserted into the bearing bush from the open end, said main seal including at least one sealing lip for sealing the sealing face of the arm and an annular preseal arranged on the seat portion of the arm and including a sealing lip for sealingly resting against the running face provided at the open end of the bearing bush, said seat portion of the arm including a cylindrical seat portion and, starting therefrom, as viewed in a section containing the longitudinal axis, a curved seat portion extends curve-like away from the longitudinal axis;

said preseal, having a bore by means of which it is positioned on the seat portion in a pretensioned way, includes a first bore portion with at least one continuous bead projecting radially inwardly towards the longitudinal axis and in the unfitted or untensioned condition, leaves open an aperture which is smaller than the diameter of the cylindrical seat portion of the arm;

said preseal including a second bore portion adapted to correspond to the extending curved seat portion of the arm;

and in a section plane containing the longitudinal axis, the preseal is U-shaped, with a first leg close to the longitudinal axis including the bore by means of which the preseal is positioned on the seat portion of the arm, and with a second outer leg connected to the first leg by a web, said second outer leg including a sealing lip which sealingly rests around the periphery of the bearing bush against the running face of the bearing bush; and the main seal includes an annular metallic carrier or a reinforcing insert which projects from the open end of the bearing bush in the direction of the preseal and extends into an annular intermediate space between the two legs of the preseal.

2. A cross member unit according to claim 1, wherein the second bore portion is also arranged in a pretensioned way on the curved seat portion.

3. A cross member unit according to claim 1, wherein the first bore portion of the preseal is associated with two beads.

4. A cross member unit according to claim 1, wherein the preseal includes an elastomer material and a metal insert.

5. A cross member unit according to claim 1, wherein at its end extending into the region between the legs of the preseal, the carrier is provided with a collar which, with reference to the longitudinal axis, is directed outwardly, and in the annular intermediate space circumferentially distributed cams are provided at the web of the preseal which are arranged opposite the collar.

6. A cross member unit according to claim 1, wherein the outer second leg of the preseal includes a second continuous sealing lip which sealingly rests against an outer face of the carrier.

* * * * *